US005503255A

United States Patent [19]

Martinsson et al.

[11] Patent Number: 5,503,255

[45] Date of Patent: Apr. 2, 1996

[54] BRAKING DEVICE FOR A MOTOR SAW

[75] Inventors: Pär B. G. Martinsson, Huskvarna; Hasse K. J. Lilja, Jönköping, both of Sweden

[73] Assignee: Aktiebolaget Electrolux, Stockholm, Sweden

[21] Appl. No.: 355,476

[22] Filed: Dec. 14, 1994

[30] Foreign Application Priority Data

Jan. 21, 1994 [SE] Sweden .................................. 9400166

[51] Int. Cl.[6] ...................................................... F16D 49/10

[52] U.S. Cl. ........................................... 188/77 W; 30/381

[58] Field of Search .................... 30/381–387; 188/77 R, 188/77 W, 166, 382

[56] References Cited

U.S. PATENT DOCUMENTS

| | | | |
|---|---|---|---|
| 4,324,045 | 4/1982 | Hoppner et al. | 30/383 X |
| 4,662,072 | 5/1987 | Wieland et al. | 188/77 R X |
| 4,753,012 | 6/1988 | Schurr | 188/77 R X |

FOREIGN PATENT DOCUMENTS

| | | | |
|---|---|---|---|
| 2922574 | 12/1980 | Germany | 30/382 |
| 3004588 | 12/1989 | Germany . | |
| 4053586 | 2/1992 | Japan | 188/77 W |
| 454495 | 5/1988 | Sweden . | |

*Primary Examiner*—Robert J. Oberleitner
*Assistant Examiner*—Alfred Muratori
*Attorney, Agent, or Firm*—Pearne, Gordon, McCoy & Granger

[57] ABSTRACT

A braking device for a motor saw including a rotatable brake drum (11), a brake band (12) surrounding the brake drum and actuatable by a spring (26) which is adapted to stretch the brake band around the brake drum, and a toggle joint mechanism (18,20) adapted to release the brake band from the drum against the action of the spring and to latch the braking device in an operating position in which the brake band is released from the brake drum. The toggle joint mechanism is actuatable by a control means (16) for adjusting the position of the brake band. The toggle joint mechanism is adapted, in the case of rupture of the brake band, to be adjusted by the spring to a position in which re-adjustment of the control means to the operating position is prevented.

5 Claims, 3 Drawing Sheets

BRAKING DEVICE FOR A MOTOR SAW

BACKGROUND OF THE INVENTION

The present invention relates to a braking device for a motor saw, including a rotatable brake drum, a brake band surrounding the brake drum and actuatable by a spring which is adapted, when in an activated position, to stretch the brake band around the brake drum, and a toggle joint mechanism adapted to release the brake band from the drum against the action of the spring and to latch the braking device in a working position in which the brake band is released, the toggle joint mechanism being actuatable by a control means for adjusting the position of the brake band relative to the brake drum.

Braking devices of this kind are used for preventing injury of the operator by the cutting tool, usually a saw chain, due to a sudden kickback of the saw. When such a kickback occurs, the control means is actuated whereby the brake band is applied to the brake drum and the saw chain is stopped. In order to enable continued operation of the saw, the braking device must then be reset to its released position which is performed by the control means and against the action of the spring.

The saw chain must be braked in a very short time which results in a heavy load on the brake band. The heavy load on the brake band, in combination with the failure to replace the brake band when worn, may, in rare occasions, lead to rupture or severing of the brake band. Since the brake band is enclosed or concealed within the saw housing, rupture of the brake band cannot be easily observed, and the operator may, therefore, reset the control means to the operational position and continue using the saw while mistakenly believing that the brake is functioning normally. It is easily realized that this implies an obvious risk of injury at the next occurrence of a kickback, since the braking device will then not function to stop the saw chain.

SUMMARY OF THE INVENTION

An object of the present invention is to eliminate the above described disadvantage present in the prior art braking devices by providing a braking device which provides a clear indication to the operator in case of rupture of the brake band.

In accordance with the present invention, the braking device provides a brake band, a brake drum, a slide operatively associated with the brake band, a spring, and a toggle mechanism. The toggle joint mechanism includes a first link and a second link. The first link is pivotally connected to the housing while the second link is pivotally connected to the first link, at one end, and to the slide at the opposite or second end.

In further accordance with the present invention, the toggle joint mechanism is adapted, in the case of rupture of the brake band, to be moved or adjusted by the spring to a position in which resetting of the control means to the working position is prevented.

BRIEF DESCRIPTION OF THE DRAWINGS

The invention will be described in more detail below with reference to the accompanying drawings, wherein.

DETAILED DESCRIPTION OF THE PREFERRED EMBODIMENT

Figure 1:
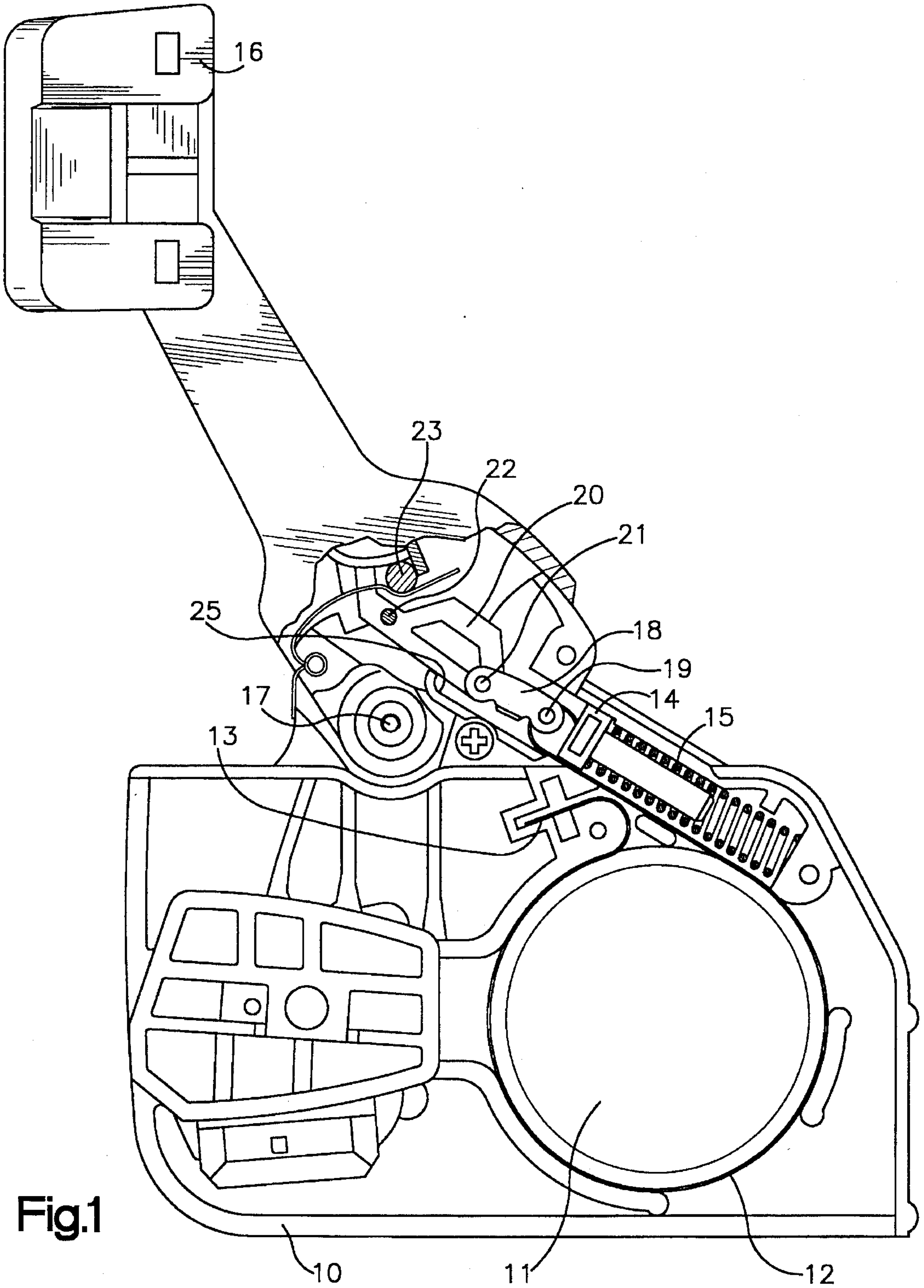
FIGS. 1–3 illustrate side elevations of a preferred embodiment of the braking device according to the invention in different operational positions.

The drawings illustrate a portion of a housing 10 of a motor saw, the cover of which is removed for the purpose of clearly showing the braking device. In the housing 10, a brake drum 11 is provided and a brake band 12 extends around the drum 11. The brake band 12 has one end thereof attached to the housing at 13 and the other or opposite end thereof attached to a movable slide 14. The slide 14 is biased or actuated by a coil spring 15. Movement or actuation of the slide 14 and the brake band 12 are controlled by a control means 16. The control means is preferably a so-called hand guard which is rotatably journalled in the housing 10 on a pivot pin 17.

The control means 16 is attached to the slide 14 by a toggle joint mechanism comprising a first link 18 and a second link 20. The first link 18 is pivotally connected to the slide 14 by means of a pivot pin 19. The second link 20 has one end which is pivotally connected to the first link 18 via a pivot pin 21 and another or opposite end which is rotatably journalled around a fixed axis 22 in the housing 10. The second link 20 is rotatable in both directions around the axis 22 as actuated by a pin 23 attached to the control means 16 and cooperating with corresponding supporting surfaces on the link 20.

FIG. 1 illustrates the braking device in its normal, at-rest, or unactuated position in which the slide 14 is kept latched in the shown position by the toggle joint mechanism. The first and second links 18, 20 maintain the slide 14 in a depressed condition, and the spring 15 under compression. The brake is thereby released and the brake band 12 is spaced from the brake drum 11 which can thus rotate freely.

Figure 2:
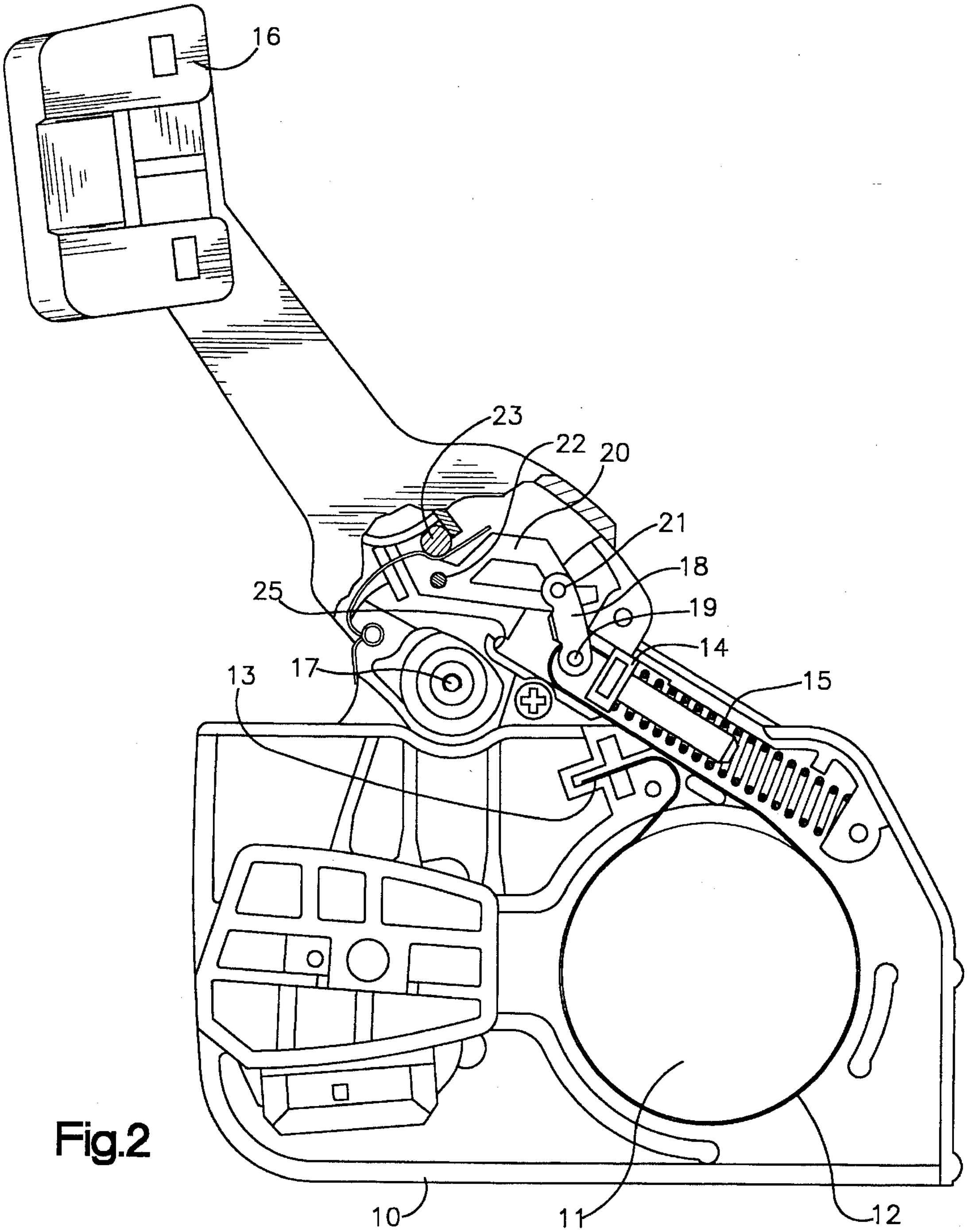

In FIG. 2 the braking device is shown in its applied, braking, or actuated position in which the control means 16 has been actuated by the operator to rotate counterclockwise whereby the slide 14 has been released by the toggle joint mechanism and has moved due to the action or bias of the spring 15, with the result that the brake band 12 has been stretched around the brake drum 11. As a result of the actuation of the braking device, rotation of the brake drum 11 is stopped in a very short time. The braking band 12 is under tension and limits movement of the slide 14. Since the links 18, 20 form an obtuse angle with each other, the slide 14 can be reset from the position shown in FIG. 2 to the position of FIG. 1 by clockwise rotation of the control means 16 which moves the slide 14 against the action of the spring 15. The braking device is thereby reset to its normal, at-rest, or unactuated position, which means that the motor saw can be put to operation again.

Figure 3:
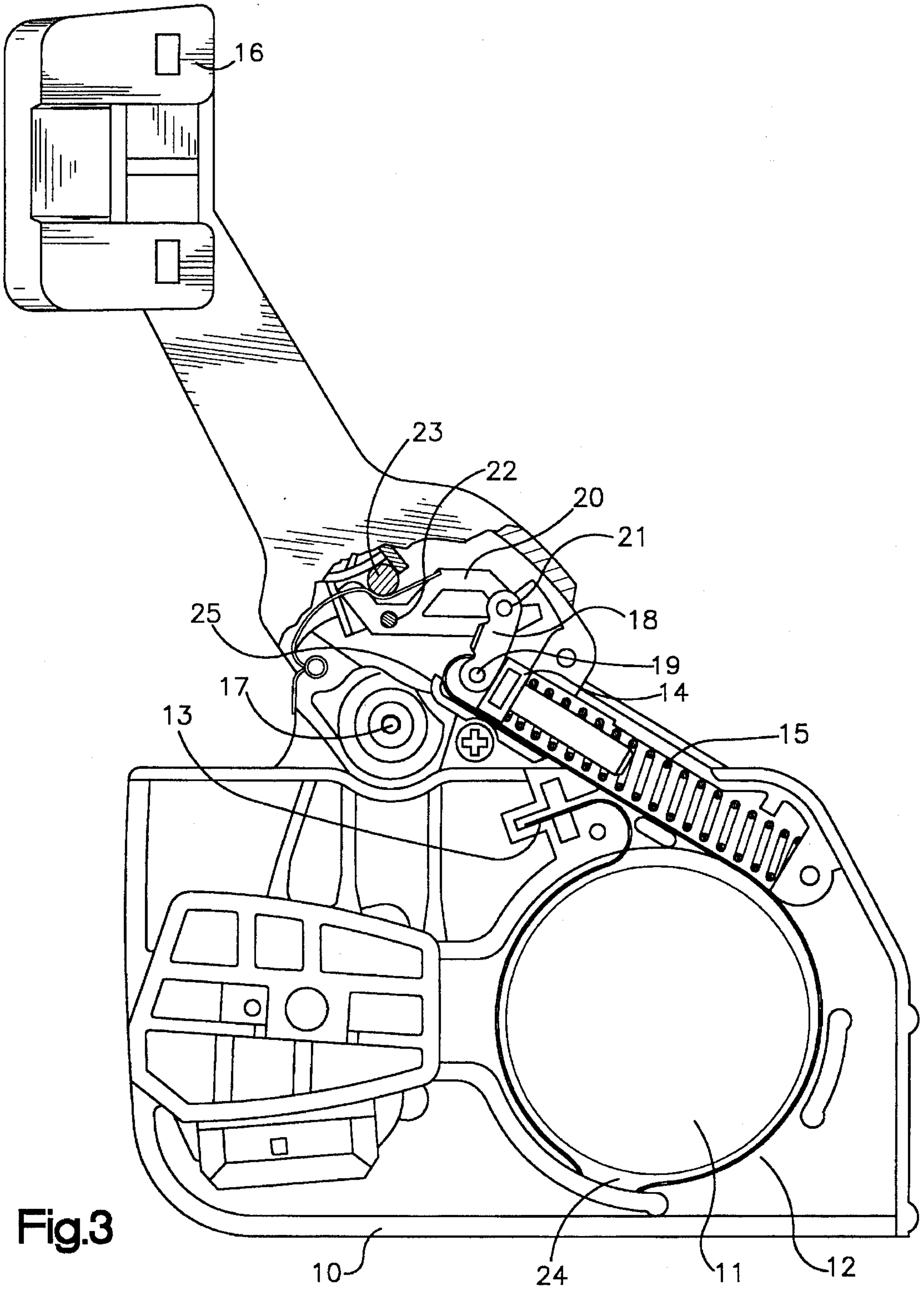

FIG. 3 shows the braking device in a position resulting from rupturing of the brake band 12. The rupture of the brake band 12 is indicated at 24. In this case, since the movement of the slide 14 is not limited or prevented by the brake band 12, the slide 14 will continue to move under the actuation of the spring 15 until the slide engages or is stopped by an abutment 25, as illustrated. In this position the links 18, 20 form an acute angle with each other whereby resetting of the control means 16 to the position in FIG. 1 is effectively prevented. The operator will thereby receive a clear indication that the braking device is not operable and should be repaired as soon as possible. Consequently, any risk that the operator will continue using the motor saw while mistakenly believing that the braking device is operating normally, has been eliminated.

The preferred embodiment described and illustrated herein is capable of numerous modifications, rearrangements, and substitutions of parts without departing from the scope and spirit of the present invention as defined by the claims appended hereto.

What is claimed is:

1. A braking device for a motor saw, comprising a rotatable brake drum (11), a brake band (12) surrounding said brake drum and actuatable by a spring (15), said spring being adapted to move said brake band into a position engaging said brake drum wherein said brake band is stretched around said brake drum, and a toggle joint mechanism (18, 20) adapted to move said brake band, against the action of said spring, into a released position wherein said brake band is spaced from said brake drum, and to latch the braking device in a working position corresponding to said released position, said toggle joint mechanism being actuatable by a control means (16) for adjusting the brake band between said engaged and released positions, wherein said toggle joint mechanism is adapted, in the case of rupture of said brake band, to be adjusted by said spring (15) to a position in which resetting of said control means (16) to said working position is prevented.

2. A braking device according to claim 1, wherein one end of the brake band (12) is connected to a slide (14) actuated by said spring (15), said toggle joint mechanism comprising a first link (18) pivotally connected to said slide, and a second link (20) operatively connected to said control means (16), one end of said second link being pivotally connected to said first link and the other end thereof being rotatably journalled on a fixed axis (22) in the saw body.

3. A braking device according to claim 2, wherein said first and second links form an obtuse angle with one another when said brake band is in said engaged position.

4. A braking device according to claim 3, wherein said first and second links form an acute angle with one another when said brake band is ruptured, thereby preventing resetting of said control means.

5. A braking device according to claim 2, wherein said first and second links form an acute angle with one another when said brake band is ruptured, thereby preventing resetting of said control means.

* * * * *